United States Patent
Kurose et al.

(10) Patent No.: US 7,778,562 B2
(45) Date of Patent: *Aug. 17, 2010

(54) EXPOSURE HEAD CONTROLLER, EXPOSURE HEAD AND IMAGE FORMATION DEVICE

(75) Inventors: Mitsukazu Kurose, Nagano-ken (JP); Yujiro Nomura, Nagano-ken (JP); Kiyoshi Tsujino, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

This patent is subject to a terminal disclaimer.

(21) Appl. No.: 12/133,829

(22) Filed: Jun. 5, 2008

(65) Prior Publication Data

US 2008/0240756 A1 Oct. 2, 2008

Related U.S. Application Data

(63) Continuation of application No. 11/298,984, filed on Dec. 9, 2005, now Pat. No. 7,397,486.

(30) Foreign Application Priority Data

Dec. 15, 2004 (JP) .............................. 2004-362424

(51) Int. Cl.
*G03G 15/043* (2006.01)
*B41J 2/385* (2006.01)
(52) U.S. Cl. ........................................ 399/51; 347/135
(58) Field of Classification Search ................. 347/135, 347/240; 399/51; 358/501; 327/37
See application file for complete search history.

(56) References Cited

U.S. PATENT DOCUMENTS 3,906,379 A * 9/1975 Tuhro ........................... 327/37

(Continued)

FOREIGN PATENT DOCUMENTS

JP 2004-050816 2/2004
JP 2004330472 A 11/2004

*Primary Examiner*—Stephen D Meier
*Assistant Examiner*—Carlos A Martinez, Jr.
(74) *Attorney, Agent, or Firm*—Hogan Lovells US LLP

(57) ABSTRACT

Provided is an exposure head controller that controls, via pulse width modulation control, the emission quantity of each light emitting element in an exposure head having a light emitting element array formed by arranging a plurality of light emitting elements in a main scanning direction and a sub scanning direction orthogonal thereto, comprising: a data retention unit that retains dot gathering control data showing whether to emit each light emitting element at the starting point side, terminal point side or in the middle of an emission period corresponding to a 1 pixel pitch in the sub scanning direction, or to divide and emit each light emitting element at the starting point side and terminal point side, emission time data showing the emission time of each light emitting element, and skew data showing the skew quantity of each light emitting element; a dot gathering operation circuit provided to each light emitting element and which operates the time in which the light emitting element is to be retained in a non-emission state from the starting point of the emission based on the dot gathering control data input from the data retention unit; a delay time measurement circuit that acquires the skew data from the data retention unit and acquires the non-emission time data showing the retention time in the non-emission state from the dot gathering operation circuit, adding these to seek the delay time to be set before starting the emission of the light emitting element, measuring the delay time, and outputting a prescribed signal after the lapse of the delay time; and an emission instruction circuit that outputs to a light emitting element drive circuit an emission instruction signal for instructing the emission of the light emitting element from the point in time the emission time data is acquired from the data retention unit and a prescribed signal is output from the delay time measurement circuit up to the elapse of the emission time indicated by the emission time data.

7 Claims, 19 Drawing Sheets

U.S. PATENT DOCUMENTS

| | | |
|---|---|---|
| 5,784,091 A | 7/1998 | Ema et al. |
| 5,933,255 A * | 8/1999 | Hirata et al. ................ 358/501 |
| 6,498,617 B1 | 12/2002 | Ishida et al. |
| 6,731,317 B2 | 5/2004 | Ema et al. ................... 347/135 |
| 6,791,596 B2 | 9/2004 | Nihei et al. ................. 347/247 |
| 7,215,353 B2 * | 5/2007 | Maeda ....................... 347/240 |
| 7,397,486 B2 * | 7/2008 | Kurose et al. ............... 347/135 |
| 2003/0112732 A1 | 6/2003 | Masui et al. .............. 369/59.12 |
| 2005/0068355 A1 | 3/2005 | Nomura et al. ................ 347/13 |
| 2005/0254870 A1 | 11/2005 | Takahashi ................... 399/388 |
| 2006/0012670 A1 | 1/2006 | Tsujino et al. .............. 347/251 |
| 2007/0188583 A1 | 8/2007 | Nomura et al. |

* cited by examiner

FIG.11A
FIG.11B
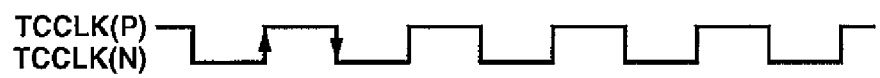
FIG.12A SPCLK
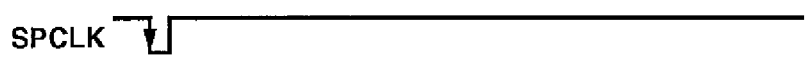
FIG.12B PDCLK
FIG.12C PAD5
FIG.12D PAD4
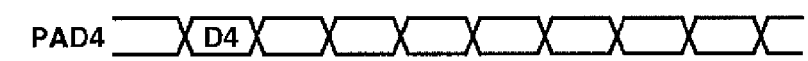
FIG.12E PAD3
FIG.12F PAD2
FIG.12G PAD1
FIG.12H PAD0

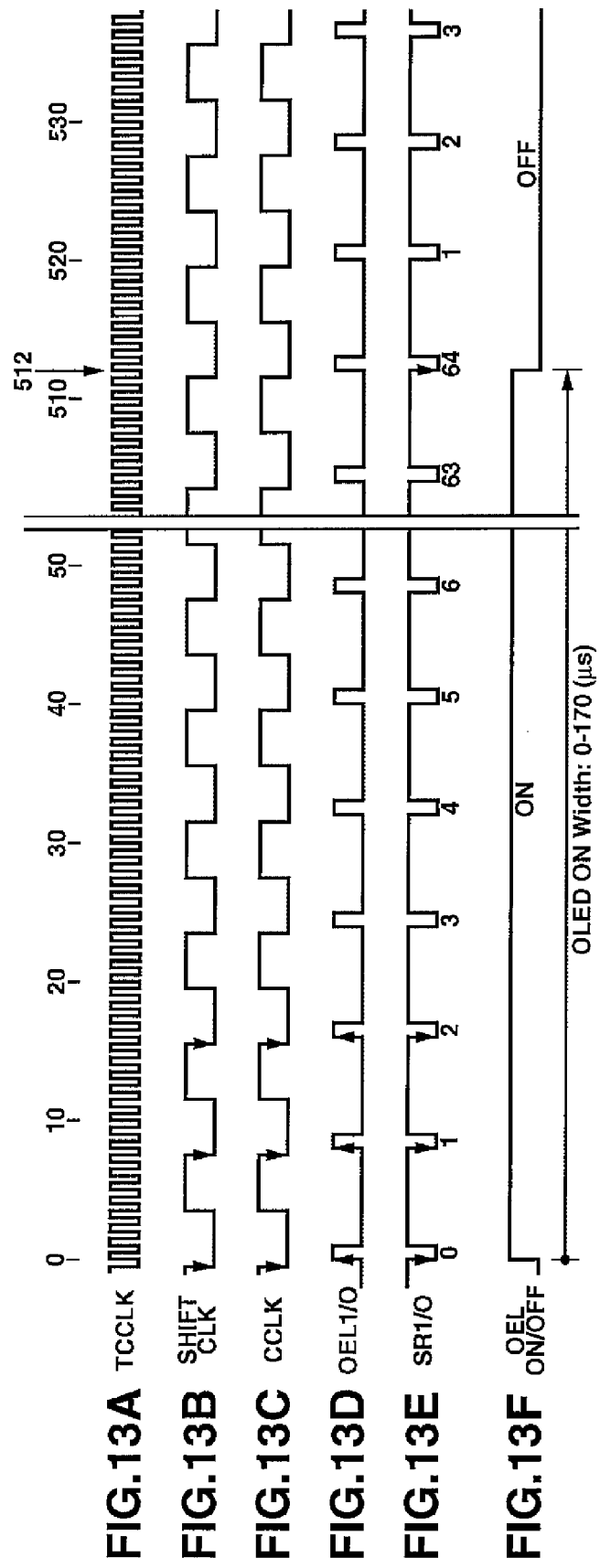

SKEW CORRECTION BEFORE CONTROL

GRADATION (DOT SIZE) CONTROL
PWM + LIGHT QUANTITY CORRECTION

MAIN SCANNING DIRECTION
SUB SCANNING DIRECTION
1 PIXEL PITCH
1 PIXEL PITCH

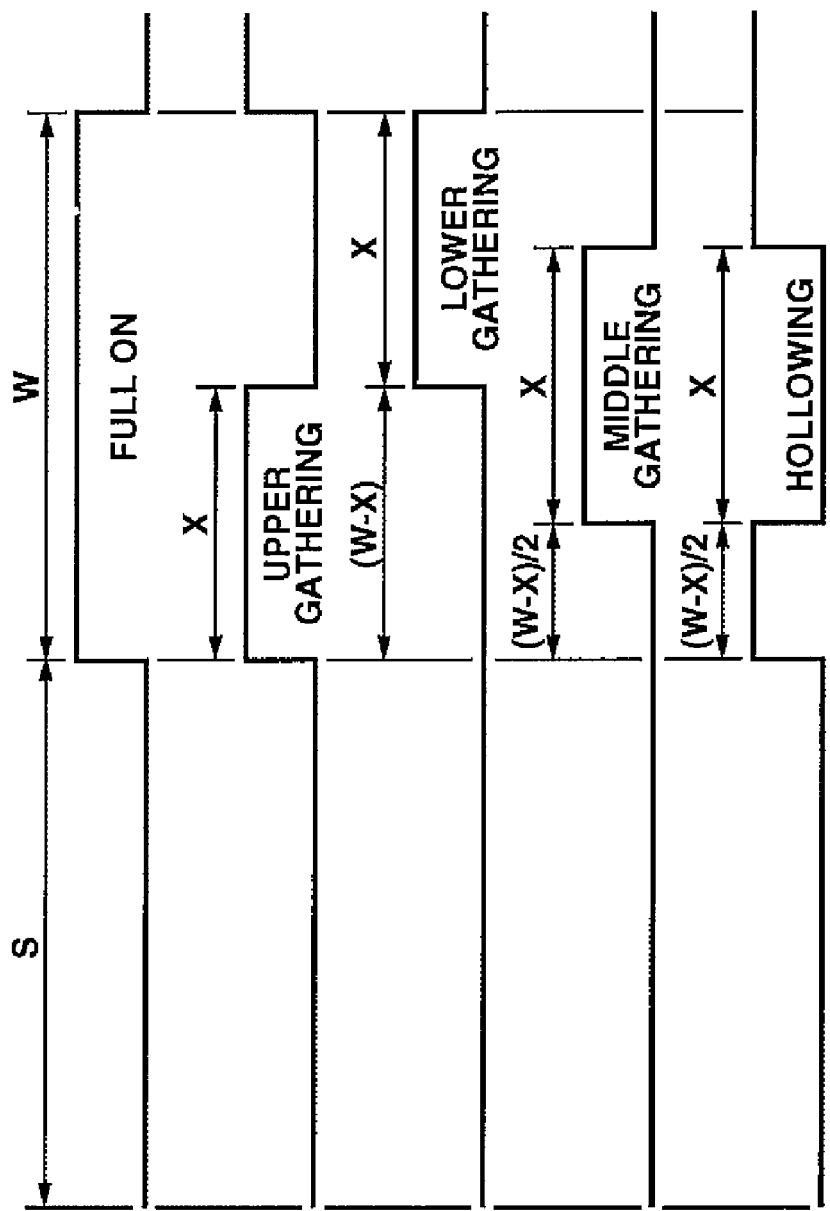

EXPOSURE HEAD CONTROLLER, EXPOSURE HEAD AND IMAGE FORMATION DEVICE

CROSS-REFERENCES

This application is a continuation of application Ser. No. 11/298,984 filed Dec. 9, 2005, the entire contents of which are incorporated by reference. Also the entire disclosure of Japanese Patent Application No. 2004-362424 filed on Dec. 15, 2004 including specification, claims, drawings and summary are incorporated herein by reference in its entirety.

BACKGROUND

1. Technical Field

The present invention pertains to an exposure head to be used for forming a latent image by exposing a photoreceptor in an image formation device such as an electrophotographic printer or copying machine.

2. Related Art

In an image formation device such as a printer or copying machine, an exposure head is used for exposing a photoreceptor in order to form an electrostatic latent image on the pre-charged photoreceptor. An image formation device employing this kind of exposure head is disclosed, for instance, in JP A-2004-50816.

From the perspective of miniaturizing and realizing the low cost of image formation devices, it is desirable to simplify the configuration of the exposure head. Contrarily, pursuant to advances in high definition of image formation devices in recent years, configuration of the exposure head is becoming more complex. For example, as a result of advances in high resolution, influences of skew (strain) caused by variation in the position of the light emitting unit due to errors during the manufacture of the exposure head will increase, and a unit for correcting such skew will play an important role. Further, control of the toner-adhered state is also becoming more complex pursuant to advances in high resolution and high gradation.

SUMMARY

Thus, an advantage of some aspects of the invention is to provide technology capable of simplifying the configuration of the exposure head.

According to a first aspect of the invention, provided is an exposure head controller that controls, via pulse width modulation control, the emission quantity of each light emitting element in an exposure head having a light emitting element array formed by arranging a plurality of light emitting elements in a main scanning direction and a sub scanning direction orthogonal thereto, including: a data retention unit, a dot gathering operation circuit, a delay time measurement circuit and an emission instruction circuit. The data retention unit retains dot gathering control data showing whether to emit each light emitting element at the starting point side, terminal point side or in the middle of an emission period corresponding to a 1 pixel pitch in the sub scanning direction, or to divide and emit each light emitting element at the starting point side and terminal point side, emission time data showing the emission time of each light emitting element, and skew data showing the skew quantity of each light emitting element. The dot gathering operation circuit is provided to each light emitting element and operates the time in which the light emitting element is to be retained in a non-emission state from the starting point of the emission based on the dot gathering control data input from the data retention unit. The delay time measurement circuit acquires the skew data from the data retention unit and acquires the non-emission time data showing the retention time in the non-emission state from the dot gathering operation circuit, adds these to seek the delay time to be set before starting the emission of the light emitting element, measures the delay time, and outputs a prescribed signal after the lapse of the delay time. The emission instruction circuit outputs to a light emitting element drive circuit an emission instruction signal for instructing the emission of the light emitting element from the point in time the emission time data is acquired from the data retention unit and a prescribed signal is output from the delay time measurement circuit up to the elapse of the emission time indicated by the emission time data.

In the foregoing configuration, the present inventors took particular note of the fact that the dot gathering control for improving the toner-adhered state and the correction of skew caused by variation in the position of each light emitting element can both be realized with emission time control of the light emitting element, which is processing to be performed on the same time axis, and these are collectively subject to data processing. Thereby, configuration of the control circuit of the exposure head can be simplified without having to abbreviate the control required for obtaining high quality printing.

Preferably, the delay time measurement circuit is configured by including an adding circuit that adds the skew data and the non-emission time data; a first counter that synchronizes with and counts up prescribed clock signals; a comparator that outputs an enable signal when the added result of the adding circuit and the count value of the first counter coincide; and a second counter that synchronizes with and counts up the clock signals from the point in time the enable signal is output from the comparator.

Thereby, a delay time measurement circuit can be realized without having to enlarge the circuit size.

Preferably, the emission instruction circuit is configured from a comparator that compares the count value output from the second counter and the emission time data, and outputs the emission instruction signal until the count value output from the second counter and the emission time data coincide.

Thereby, an emission instruction circuit can be realized without having to enlarge the circuit size.

According to a second aspect of the invention, provided is an exposure head employing the controller pertaining to the first aspect of the invention described above.

Thereby, configuration of the exposure head can be simplified.

According to a third aspect of the invention, provided is an image information device configured by including the exposure head pertaining to the second aspect of the invention described above.

Thereby, it will be possible to configure an image formation device having favorable image quality (printing quality) by using an exposure head with a simple configuration.

BRIEF DESCRIPTION OF THE DRAWINGS

FIGS. 11A and 11B are timing charts for explaining the input signal timing of the timing controller;

FIG. 12A to 12H are diagrams showing the transfer timing of emission time data to be sent from the timing controller to the shift register;

FIG. 13A to 13F are timing charts for explaining in detail the selector unit output signal timing of the timing controller;

FIG. 17A to 17E are diagrams for explaining the drive waveform of a light emitting element for performing skew correction and dot gathering control;

DESCRIPTION OF EXEMPLARY EMBODIMENTS

Embodiments of the invention are now explained with reference to the drawings.

Overall Configuration of Exposure Head

Figure 1:
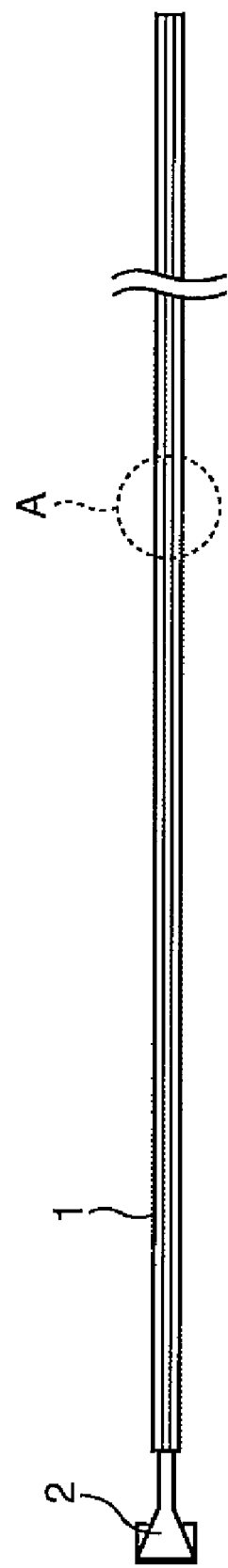
FIG. 1 is a plan view of the overall exposure head of an embodiment viewed from the topside thereof.

FIG. 1 is a plan view of the overall exposure head of an embodiment viewed from the topside thereof. The exposure head 1 shown in FIG. 1 is used for forming a latent image by exposing a photoreceptor in an image formation device such as a printer or copying machine. The exposure head 1 is formed such that the overall length thereof is slightly longer than the printing width of the main scanning direction. Incidentally, since the actual cross section size of the exposure head 1 is extremely small, FIG. 1 is not able to provide a sufficient representation. Thus, enlarged views and the like will be hereinafter used as appropriate for providing detailed explanations of the invention. Further, a connector 2 is provided at one end of the exposure head 1, and the exposure head 1 is connected to an image data transmission unit (described later) on the printer engine side via this connector 2.

Figure 2:
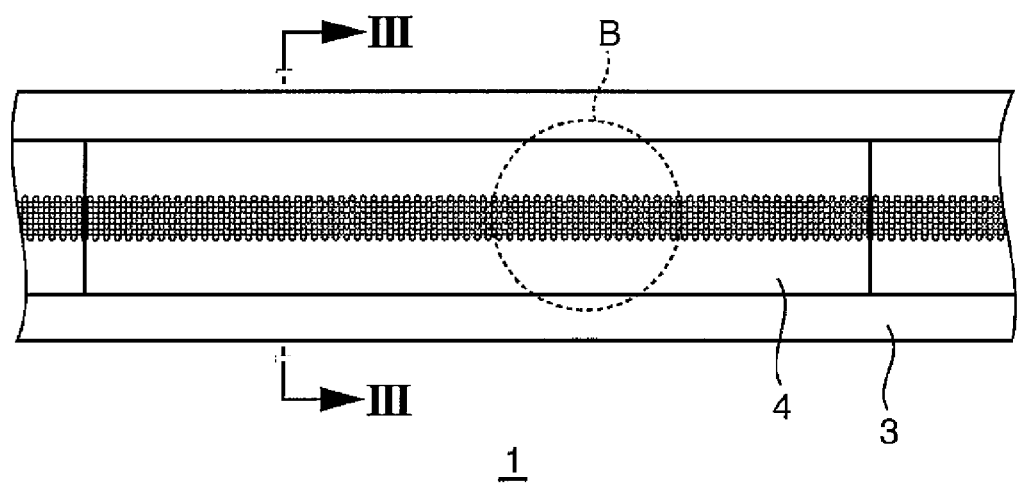
FIG. 2 is a partially enlarged view of portion A of the exposure head shown in FIG. 1.
Figure 3:
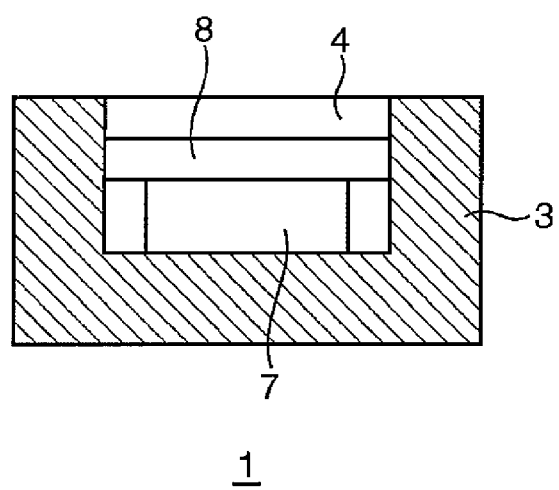
FIG. 3 is a cross section in the direction of line III-III shown in FIG. 2.

FIG. 2 is a partially enlarged view of portion A of the exposure head 1 shown in FIG. 1. FIG. 3 is a cross section in the direction of line III-III shown in FIG. 2. As shown in each of these diagrams, the exposure head 1 is configured by including a support frame 3, a condenser lens array 4, a driver IC 7 and a light emitting element array 8. As shown in FIG. 3, this exposure head 1 is configured such that the condenser lens array 4 is disposed at one face side of the light emitting element array 8, the drive IC 7 is disposed at the other face side thereof and these are integrally housed in the support frame 3.

The light emitting element array 8 is formed from a light emitting element group in which a plurality of light emitting elements are provided on a glass substrate. In this embodiment, an organic electroluminescence (EL) element is employed as the light emitting element. The light emitting element group is disposed in a zigzag shape according to the main scanning direction and sub scanning direction of the exposure head 1.

The condenser lens array 4 is disposed at the topside of the light emitting element array 8, and includes a condenser lens group for condensing each light irradiated from the respective light emitting elements.

The driver IC 7 is mounted on the other face side of the condenser lens array 4 of the light emitting element array 8, and is configured from a control circuit and drive circuit for controlling/driving a prescribed block worth [of light emitting elements] among the light emitting element group disposed in a zigzag shape according to the main scanning direction and sub scanning direction of the exposure head 1. With the exposure head 1 of this embodiment, a plurality of these driver ICs 7 are provided along the main scanning direction of the exposure head.

Figure 4:
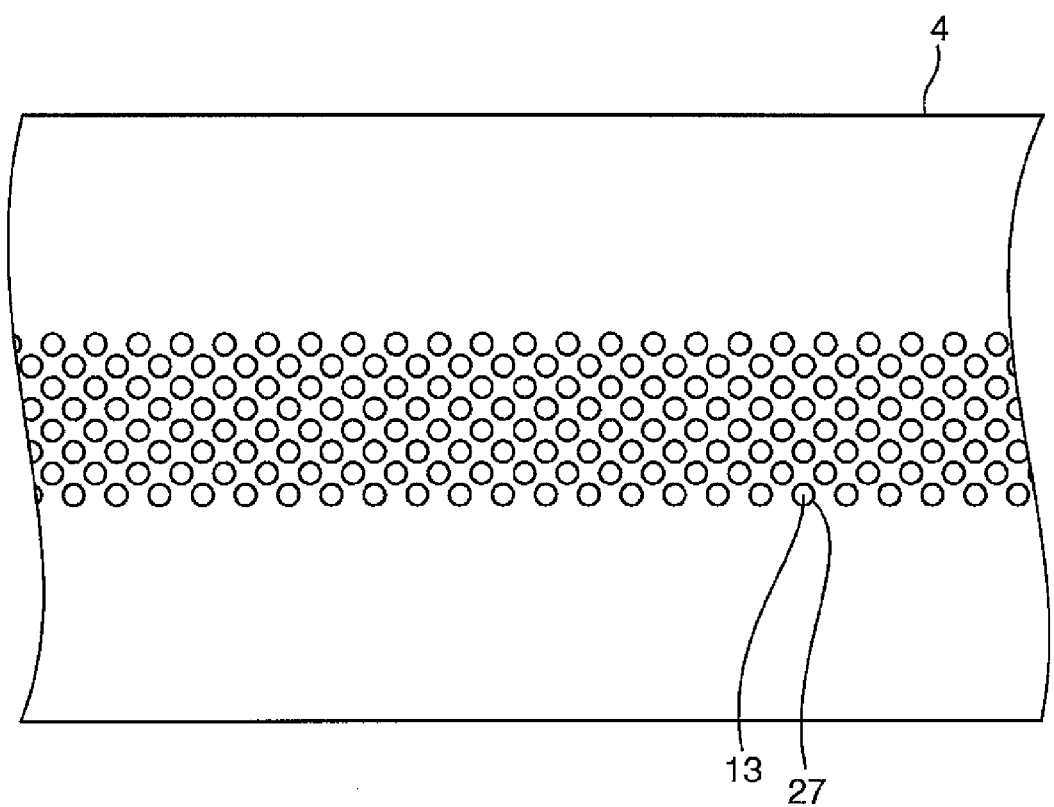
FIG. 4 is a partially enlarged view of portion B of the exposure head shown in FIG. 2.

FIG. 4 is a partially enlarged view of portion B of the exposure head 1 shown in FIG. 2, and shows the detailed configuration of the condenser lens array 4. The condenser lens array 4 is configured based on a glass substrate, and is structured such that a condenser lens 13 is embedded in each through-hole (light guiding hole) 27 provided to the glass substrate. These condenser lenses 13 are arranged along the main scanning direction in a number corresponding to a prescribed number of pixels, and eight of these rows are arranged along the sub scanning direction to form a condenser lens group. The adjoining rows of condenser lenses are each shifted in half the interval (half pitch) of the arrangement of the condenser lenses 13, and the overall condenser lens group is thereby arranged in a zigzag shape.

Further, the light emitting element group of the foregoing light emitting element array 8 is formed corresponding one-to-one with the arrangement of the condenser lens group of this condenser lens array 4. Since the arrangement of the light emitting element group is roughly the same as the arrangement of the condenser lens group shown in FIG. 4, the illustration thereof is omitted. In this example, 7680 through-holes 27 and light emitting elements are formed in the main scanning direction. Among the 7680 through-holes and light emitting elements, the odd numbered through-holes 27 and light emitting elements are arranged in the first row of the sub scanning direction, and the even numbered through-holes 27 and light emitting elements are disposed in the second row of the sub scanning direction. Similarly, 7680×4 through-holes 27 and light emitting units form a total of 8 rows. Light irradiated from each light emitting element of the light emitting element array 8 passes through the foregoing through-hole 27 and arrives at each condenser lens 13, is condensed by each condenser lens 13, and then discharged outside the exposure head 1.

Figure 5:
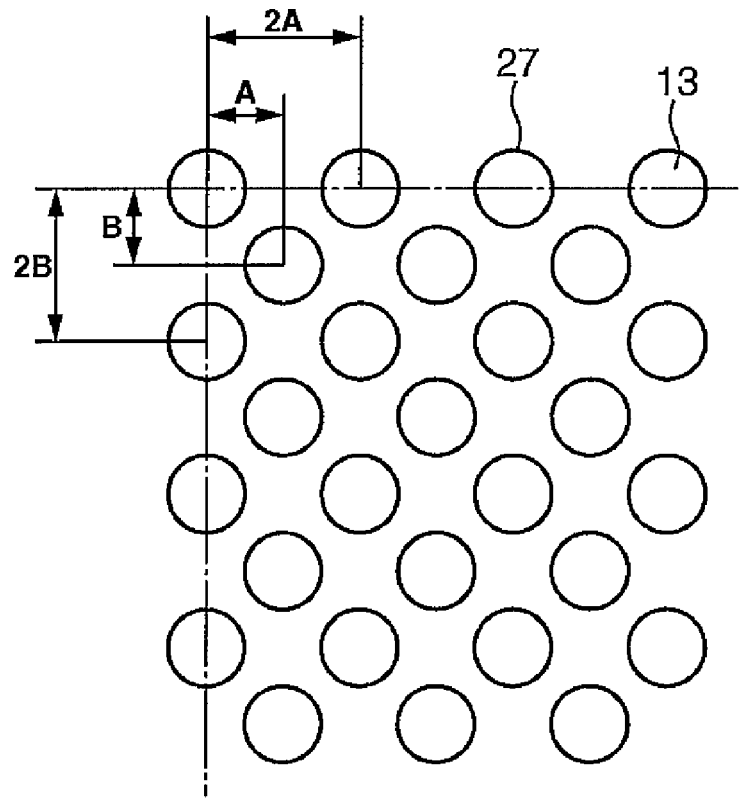
FIG. 5 is a diagram for explaining in further detail the arrangement of the condenser lens array.
Figure 6:
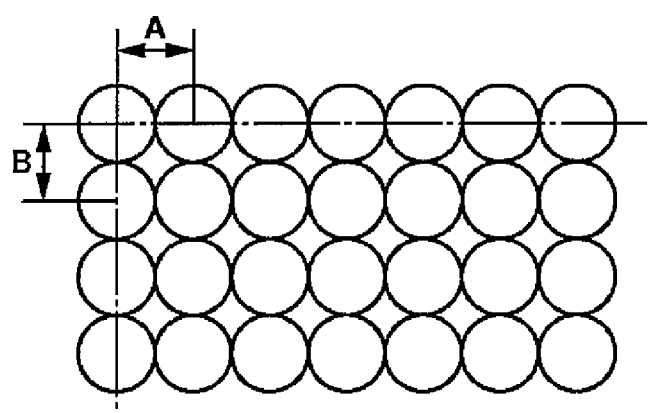
FIG. 6 is a diagram for explaining the state upon exposing the photoreceptor with the exposure head arranged as shown in FIG. 5.

FIG. 5 is a diagram for explaining in further detail the arrangement of the condenser lens array 4. Further, FIG. 6 is a diagram for explaining the state upon exposing the photoreceptor with the exposure head arranged as shown in FIG. 5.

As described above, each condenser lens 13 is press fitted into the through-hole 27, and the light emitting unit of each light emitting element of the light emitting element array 8 is disposed immediately below each condenser lens 13. For instance, if the resolution of the main axis direction (main scanning direction) of the exposure head 1 is 600 dpi, pitch A of the light emitting units of each light emitting element will be 1/600 inch, and the light emitting unit pitch on the same line of the main axis direction will be 2A (=1/300 inch). Further, when the emission shifting speed of the sub axis direction (sub scanning direction) coincides with the paper feeding speed, light emitting unit pitch B will become B=A. The light emitting element array 8 of this embodiment is configured as described above, and a plurality of light emitting units of each light emitting element are arranged in a zigzag shape in the sub axis direction. FIG. 6 shows a state of exposing the photoreceptor with the exposure head 1 having the foregoing arrangement in which the pitch is 600 dpi (A=B) for both the main axis direction and sub axis direction.

Configuration of Exposure Control Circuit

Figure 7:
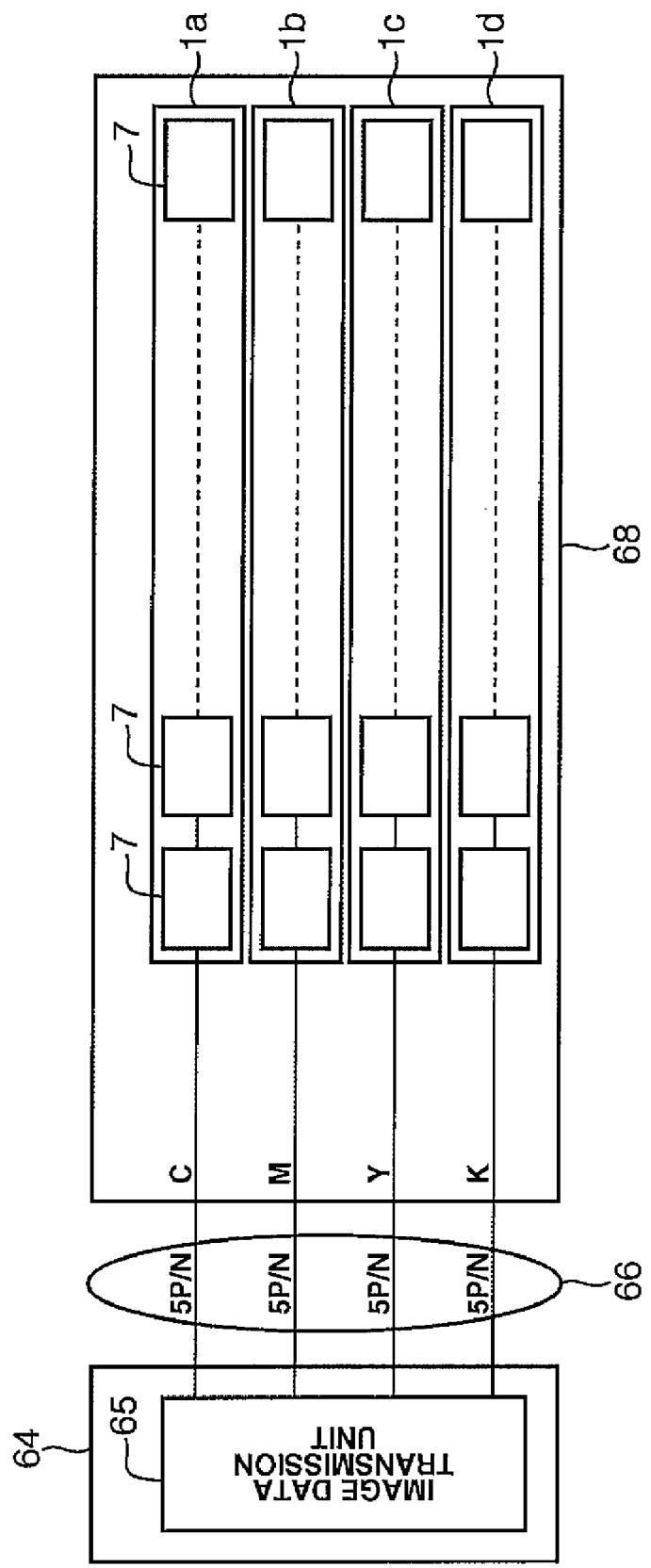
FIG. 7 is a block diagram showing a configuration example of the exposure control circuit mainly illustrating the path of image data inside the image formation device.

FIG. 7 is a block diagram showing a configuration example of the exposure control circuit mainly illustrating the path of image data inside the image formation device, and illustrates an exposure control circuit in a tandem printer. Functions of the respective components are now explained while following the flow of image data with reference to FIG. 7.

Image data of each color of CMYK (C: Cyan, M: Magenta, Y: Yellow, K: Black) subject to image processing by a printer controller 64 is parallel/serial converted with an image data transmission unit 65, and becomes the respective LS (LVDS SARDES) signals 66 of CMYK. Each LS signal 66 of CMYK is sent to the respective exposure heads 1a, 1b, 1c, 1d of CMYK located at a head control unit 68 on the printer engine side. A prescribed number of driver ICs 7 are connected in a daisy chain to each exposure head 1a to 1d. One line worth of image data of the main scanning direction is divided and received by each driver IC 7, serial/parallel converted and sequentially retained in a shift register inside each driver IC 7. Thereafter, in synchronization with the printing operation of the printer mechanism, each light emitting element of the light emitting element array 8 is ON/OFF controlled in accordance with the gradation value of the image data.

Figure 8:
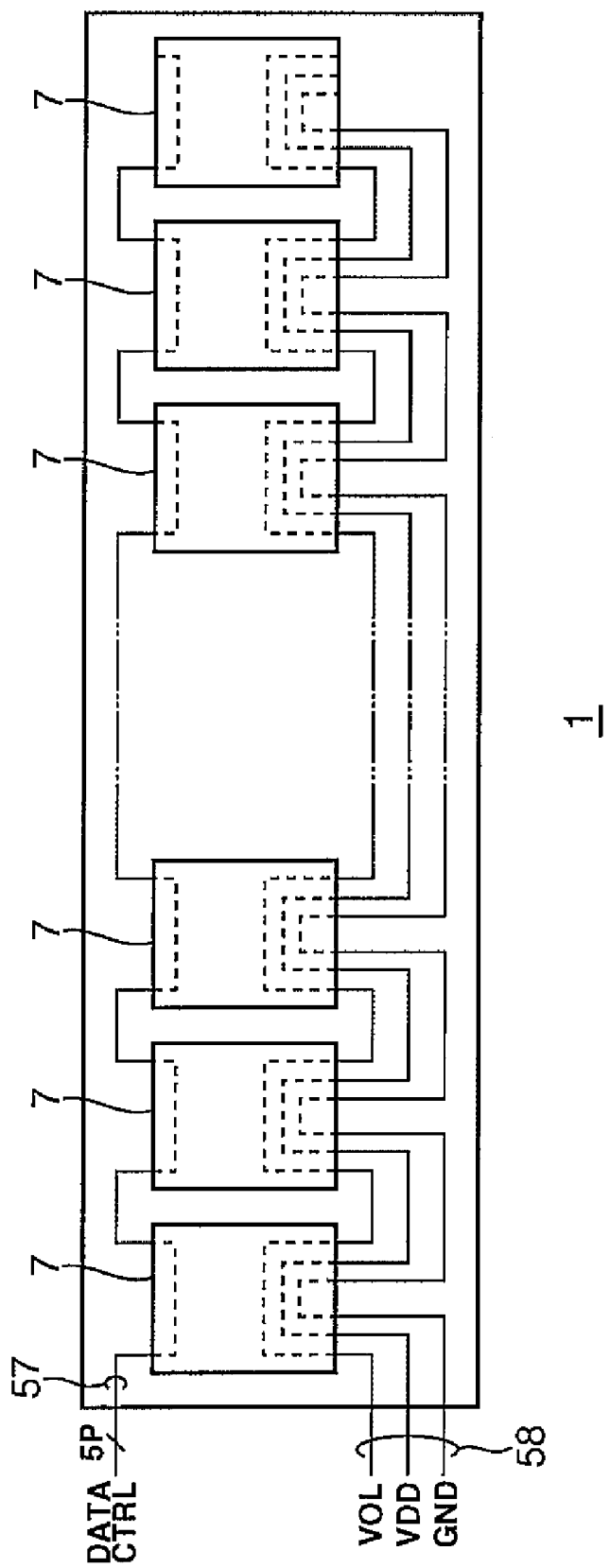
FIG. 8 is a block diagram for explaining a configuration example of the control circuit of an exposure head.

FIG. 8 is a block diagram for explaining a configuration example of the control circuit of the exposure head 1. In the exposure head 1 of this embodiment, a prescribed number of (40 in this example) driver ICs 7 are mounted on the other face side of the condenser lens array 4 of the light emitting element array 8 along the main scanning direction. Each driver IC 7 controls/drives 1 block assigned respectively among the plurality of lines of organic EL arrays arranged in a zigzag shape according to the main scanning direction and sub scanning direction. The data control line 57 is a signal line for connecting a prescribed number of driver ICs 7 in a daisy chain in the main scanning direction, and delivering printing data sent from the printer controller to the driver IC 7 allocated per line. The power source line 58 is a power supply line for supplying power to the driver ICs 7 disposed in a prescribed number in the main scanning direction, and includes a power source line VOL for driving the light emitting element, a logic power source line VDD, and a common ground line GND. The data control line 57 and power source line 58 are both connected to each driver IC 7 in a daisy chain, and this signal line and power source line are also wired inside each driver IC 7 as shown in FIG. 8, and the wiring on one face of the glass substrate configuring the light emitting element array 8 can be easily patterned without crossing each other. The data control line 57 and power source line 58 are formed on the glass substrate via ITO or the like, and aluminum or gold plates may be applied in order to lower the wiring resistance.

Figure 9:
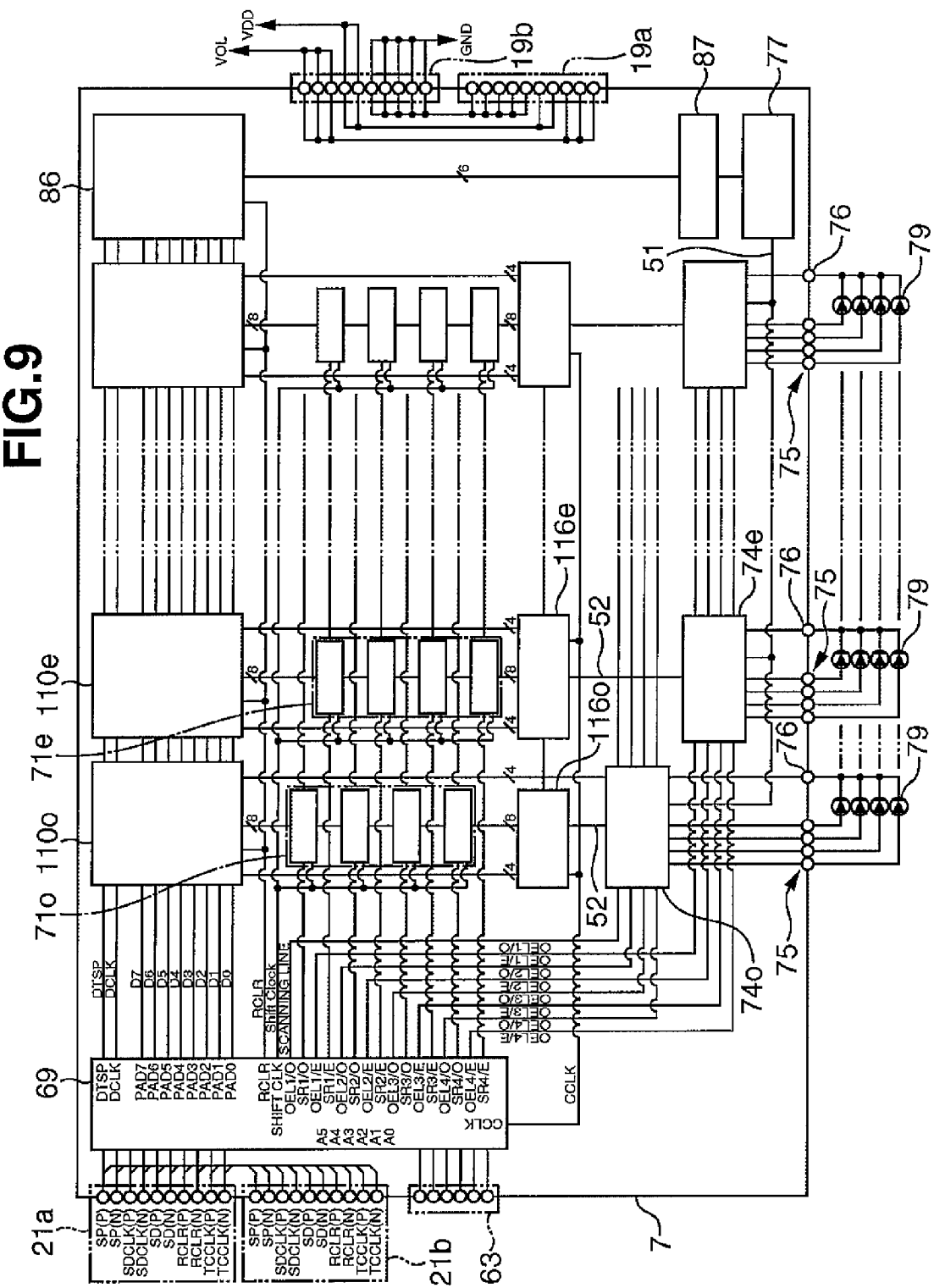
FIG. 9 is a diagram for explaining in detail the circuitry of each driver IC.

FIG. 9 is a diagram for explaining in detail the circuitry of each driver IC 7. As described above, the exposure head 1 of this embodiment includes a prescribed number of driver ICs 7 for covering the printing width of the main scanning direction. In this example, the configuration is such that a single driver IC 7 controls 192 light emitting elements, and a total of 40 driver ICs 7 are connected in a daisy chain, but this is arbitrary. Further, in the case of this example, although the circuitry is configured such that a single driver IC 7 controls 4 light emitting elements arranged in the sub scanning direction, this number may also be set arbitrarily as required. The configuration and function of the respective components are now explained along the flow of signals.

Control line pads 21a, 21b are connected to an image data transmission unit 65 on the printer controller side via 5 sets of differential signal wirings 66 as shown in FIG. 7, and are further connected to a timing controller 69 inside the driver IC 7. Each control line pad 21a, 21b is a terminal prepared for mutually connecting the driver ICs 7 in a daisy chain upon arranging the respective driver ICs 7 in the main scanning direction. For instance, the control line pad 21a is connected to the image data transmission unit 65, and the control line pad 21b is connected to the control line pad 21a of another driver IC 7 (c.f. FIG. 8) disposed adjoining thereto.

With the power source line pads 19a, 19b, half among the plurality of terminals corresponds to logic power source VDD, and the remaining half corresponds to ground potential GND. Each power source line pad 19a, 19b is a terminal prepared for mutually connecting the driver ICs 7 upon arranging the respective driver ICs 7 in the main scanning direction.

An address setting pad 63 is used for setting the address of the respective driver Cs 7. Since there are 40 driver ICs 7 mounted in this example, 40 combinations will be set. This combination can be set by providing a digital signal to the address setting pad 63.

A timing controller 69 counts the number of SP (PIN) signal pulses of the control line, and loads data when comparing the addresses set with the foregoing address setting pad 63 and such addresses coincide. Emission time data (gradation data) input from the control line pad 21a is converted from serial data into parallel data in a deserializer (not shown) located at the input stage of the timing controller 69, and is sequentially transmitted in clock synchronization with the shift registers 71o, 71e located where the 192 registers 110o, 110e extend rightward. Each register 110o, 110e outputs emission time data to the respective shift registers 71c, 71e. Further, the timing controller 69 outputs a Shift Clk signal, SRn/O signal and SRn/E signal (where n is respectively a natural number) for controlling the operation timing of each shift register 71o, 71e. Further, the timing controller 69 outputs an OELn/O signal and OELn/E signal (where n is respectively a natural number) for controlling the operation timing of the light emitting element drive circuits 74o, 74e.

The shift registers 71o, 71e respectively have 4 registers corresponding to the light emitting element array 8 continued in the sub scanning direction, and synchronize the emission time data sent from each register 110o, 110e with the Shift Clk signal and sequentially shift the emission time data. And, the shift registers 71o, 71e output emission time data to the emission timing control circuits 116o, 116e in accordance with the SRn/O signal and SRn/E signal from the timing controller 69.

The light emitting element drive circuits 74o, 74e drive the light emitting element selected by an anode connection terminal 75 and a cathode connection terminal 76 based on the output signal (emission instruction signal) provided from the emission timing control circuits 116o, 116e via the capacity line and the timing signal provided from the timing controller 69 via the scanning line. These light emitting element drive circuits 74o, 74e are separately located in the odd numbered lines and even numbered lines inside the driver IC 7.

A power adjustment circuit 77 has a function of adjusting the power to be supplied to the light emitting element drive circuits 74o, 74e through the power supply line. Power conditioning by this power adjustment circuit 77 is conducted by applying external resistance in an appropriate value to the Vref terminal provided to the driver IC 7. The power supply line 51 connected to the output of the power adjustment circuit 77 is used for supplying drive power to the respective light emitting elements 79.

A light quantity adjustment register 86 retains light quantity adjustment data for adjusting the light quantity of the light emitting element 79 for each driver IC 7. Light quantity adjustment data is output from the timing controller 69, sequentially shifted with the 192 registers 110o, 110e, and retained in the light quantity adjustment register 86.

A digital/analog (D/A) converter 87 receives 6 bit light quantity adjustment data from the light quantity adjustment register 86, converts this into analog data (voltage signal) and supplies it to the power adjustment circuit 77.

Control Timing

Figure 10A:
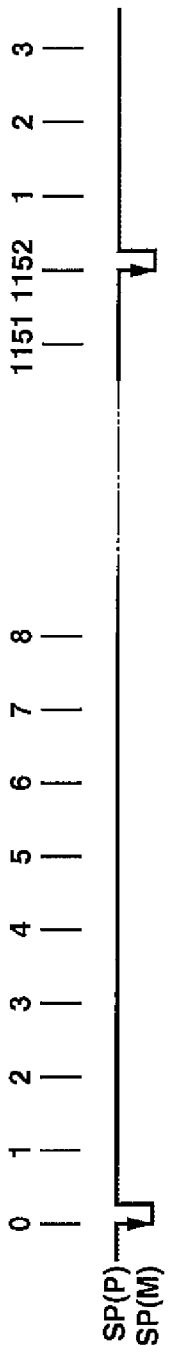
FIG. 10A to 10C are timing charts for explaining the input signal timing of the timing controller.
Figure 10B:
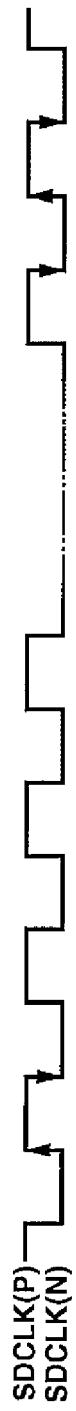
Figure 10C:

FIG. 10A to 10C are timing charts for explaining the input signal timing of the timing controller 69. The control line of the driver IC 7 is formed from 5 sets of differential lines, and FIG. 10 explains the timing of loading the emission time data.

The signal SP (P/N) is a start signal, and a pulse is generated before the reception of the emission time data, and, thereafter, is generated for each reception of 192 pixels×6 bit=1152 emission time data (FIG. 10A). The timing controller 69 counts the number of pulses of this SP (P/N) signal, compares it with the address value set in this driver IC 7, and loads subsequent 192×6 data when they coincide.

The signal SDCLK (P/N) is a serial data synchronizing clock, and serial data is read in synchronization with both the rise and fall of the clock (FIG. 10B). The cycle of the signal SDCLK is a value obtained by dividing the maximum emission time of each light emitting element with the number of light emitting elements of the main scanning direction, and further dividing this with the emission time data width, and multiplying the number of readings in the signal SDCLK cycle to such value. These values, for instance, will be as indicated below (in the case of an A4, 600 dpi, 50 ppm tandem color printer).

Maximum emission time=170 (μsec)
Number of light emitting elements of main axis direction=7680 (elements)
Emission time data width ~6 (bit)
Number of readings in SDCLK cycle=2 (times)
SDCLK cycle=170 (μsec)÷7680÷6×2=7.4 (nsec)
Therefore, the signal SDCLK frequency will be roughly 135.5 MHz.

The signal SD (PIN) is one set of 6 bit serial data (emission time data) and, as shown in FIG. 10, is read by being synchronized with the signal SDCLK (FIG. 10C).

FIGS. 11A and 11B are timing charts for explaining the input signal timing of the timing controller 69, and shows the timing of 2 sets of input signals other than the input signals shown in FIG. 10 among the 5 sets of differential input signals of the driver IC 7.

The signal RCLR (P/N) is a data clear signal of the shift registers 110o, 110e, and the emission time data output to the shift registers 71 (o, e) is cleared with the pulse (FIG. 11A). Incidentally, the signal RCLR (PIN) doubles as a data clear signal of the light quantity adjustment register.

The signal TCCLK (P/N) is a reference clock relating to the emission time control of the light emitting element controlled by the timing controller 69, and the timing of the signal Shift Clk, signal CCLK, signal OELn/O, signal OELn/E, signal SRn/O and signal SRn/E is determined based thereon (FIG. 11B).

FIG. 12A to 12H are diagrams showing the transfer timing of emission time data to be sent from the timing controller 69 to the shift registers 110o, 110e. The signal SPCLK is a transfer start signal of image data (FIG. 12A), and the signal PDCLK is a synchronizing clock upon data transfer (FIG. 12B). The signal PADn (n: 0 to 5) is emission time data, and is sequentially written in the shift registers 110o, 110e upon synchronizing with the rise and fall of the signal PDCLK (FIG. 12C to FIG. 12H).

FIG. 13A to 13F are timing charts for explaining in detail the selector unit output signal timing of the timing controller 69.

The signal TCCLK is a reference clock for controlling the emission time of the light emitting element, and the cycle thereof is a value obtained by dividing the maximum emission time of each light emitting element with the emission time control division number, and further dividing this with the number of lines of the sub scanning direction (FIG. 13A). For instance, in the case of an A4, 600 dpi, 50 ppm tandem color printer, the values will be as follows.

Maximum emission time=170 (μsec)
Emission time control division number=2^6=64 (division)
Number of lines of sub scanning direction=8 (lines)
TCCLK cycle=170 (μsec)÷64÷8=332 (nsec)
Therefore, the signal TCCLK frequency will be roughly 3 MHz.

The signal SHIFT CLK is a clock for sequentially shifting the register retention value of the shift registers 71o, 71e, and is a value obtained by dividing the maximum emission time of each element with the emission time control division number (FIG. 13B).

The signal CCLK is a count input signal of the emission timing control circuits 116o, 116e, and has the same frequency as the signal SHIFT CLK (FIG. 13C).

The scanning line signal OEL1/O and register selection signal SR1/O synchronize at the same timing from the fall of the signal SHIFT CLK to the rise of the first TCCLK, and generate a pulse worth 1 cycle of the signal TCCLK clock (FIG. 13D, FIG. 13E).

The signal OEL ON/OFF shows the ON time (emission time) of the light emitting element 79 and, in this example, the emission time width is between 0 microseconds to a maximum emission time of 170 microseconds (FIG. 13F).

The emission operation is now explained with reference to these signals. The emission time data output from the first stage register of the shift register 71o based on the register selection signal SR1/O is compared with the counter value, and an ON or OFF signal is output to the capacity line 52. Meanwhile, at the same timing, the scanning line signal OEL1/O is output to the first stage light emitting element drive circuit 74 in prescribed intervals.

As described above, if the capacity line 52 is ON when the scanning line signal OEL1/O is ON, the light emitting element 79 will illuminate. And even when the scanning line signal OEL1/O is turned OFF, illumination of the light emitting element 79 will be maintained. Further, if the capacity line 52 is OFF when the scanning line signal OEL1/O is ON, the light emitting element 79 will go out.

Figure 14:
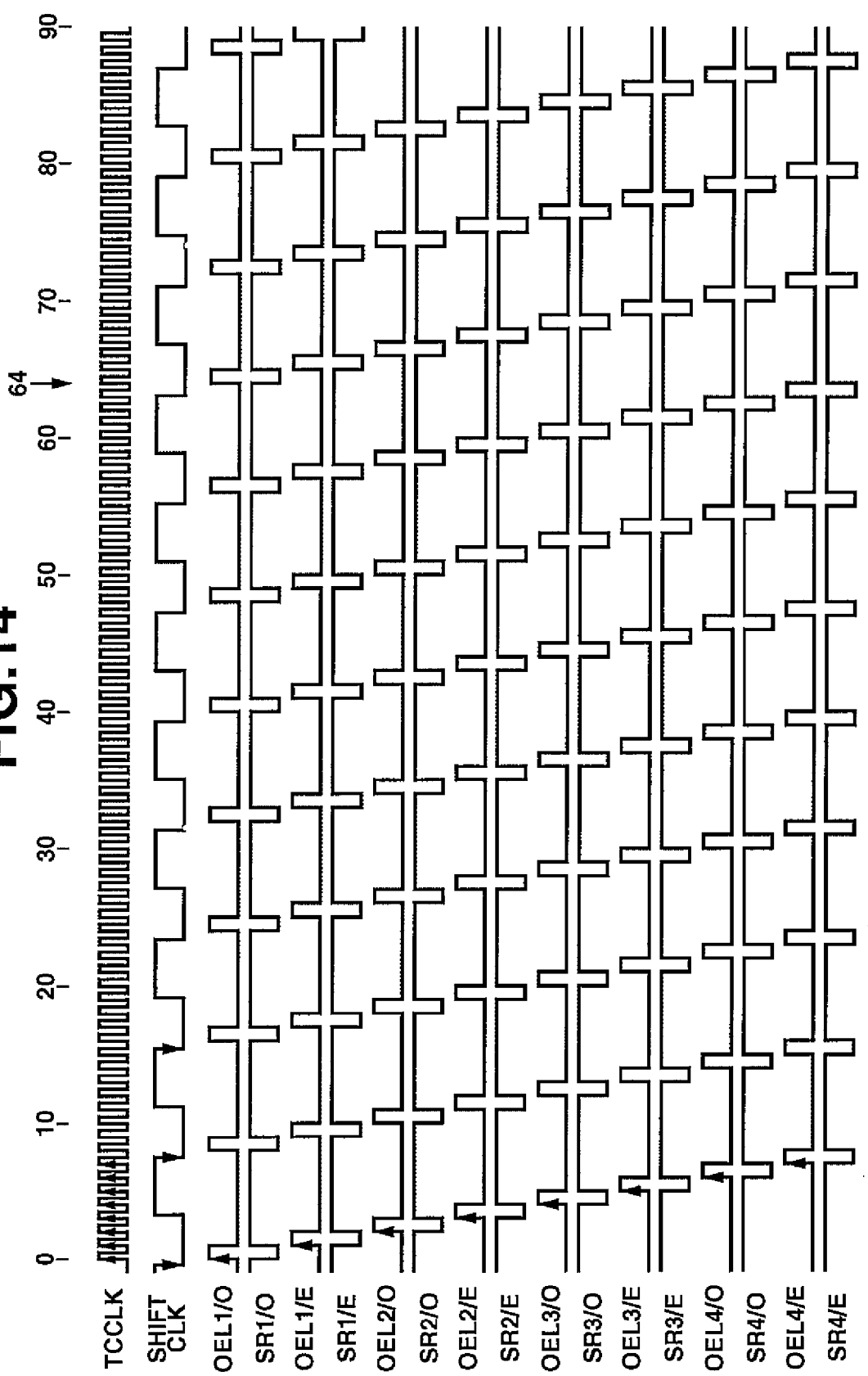
FIG. 14 shows timing charts for explaining the selector unit of the timing controller and the signal timing of the light emitting element drive circuit.

FIG. 14 shows timing charts for explaining the selector unit of the timing controller 69 and the signal timing of the light emitting element drive circuit. In FIG. 14, the emission control timing of light emitting elements in a total of 8 lines combining the even numbered and odd numbered lines of the sub scanning direction will be explained.

The scanning line signal OELn/O and register selection signal SRn/O synchronize at the same timing from the fall of the signal SHIFT CLK to the rise of the nth signal TCCLK, and generate a pulse worth 1 cycle of the signal TCCLK clock. Since the register selection signal SRn/O will select the register of the nth line of the shift register 71, the emission time data output from this register is compared with the counter value at the comparator 73, and an ON or OFF signal is output to the capacity line 52. Meanwhile, at the same timing, the scanning line signal OELn/O selects the light emitting element scanning line of the nth line. As described above, the light emitting element drive circuit 74 is able to turn ON/OFF the light emitting element while the scanning line is being selected based on the state of the capacity line 52 at such time. Accordingly, by shifting the selection timing of the scanning line connected to other light emitting element drive circuits sharing the capacity line 52, a plurality of light emitting element drive circuits 78 can be driven based on time division.

When the emission based on the emission time data of each register of the shift register 71 is complete, the emission time data of each register for each 64 pulse of the signal SHIFT CLK is shifted to the subsequent register, and similarly emitted. Here, by moving the relative positions of the sub scanning direction of the photoreceptor and organic EL array, exposure based on the same emission time data can be superposed on the same pixel on the photoreceptor.

Details of Skew Control and Dot Gathering Control

The configuration and basic operation of the exposure head 1 of this embodiment are as described above, and the configuration and operation of the emission timing control circuits 116o and 116e are now described in further detail.

Figure 15C:
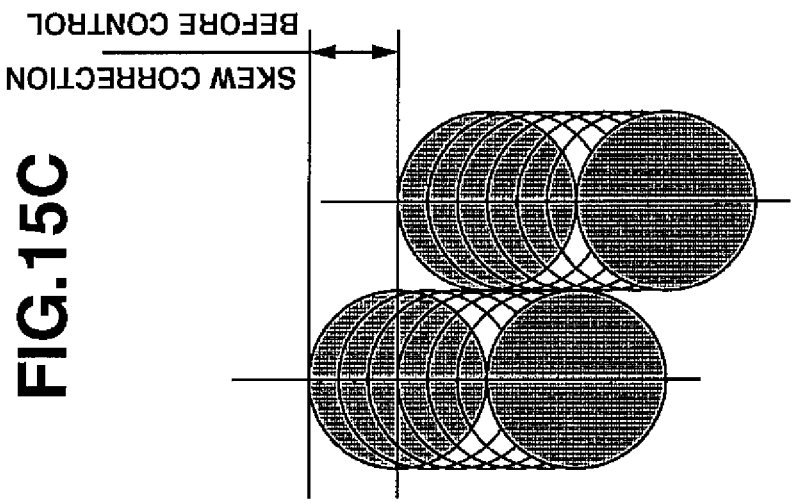
FIG. 15A to 15C are diagrams for schematically explaining the contents of skew correction.
Figure 15B:
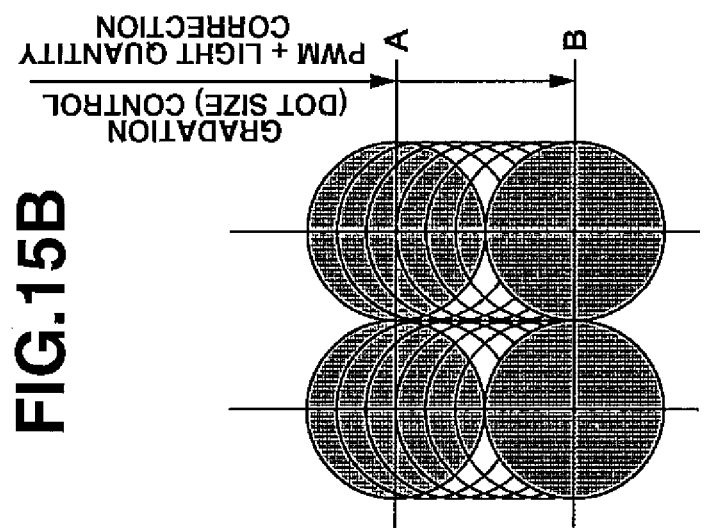
Figure 15A:
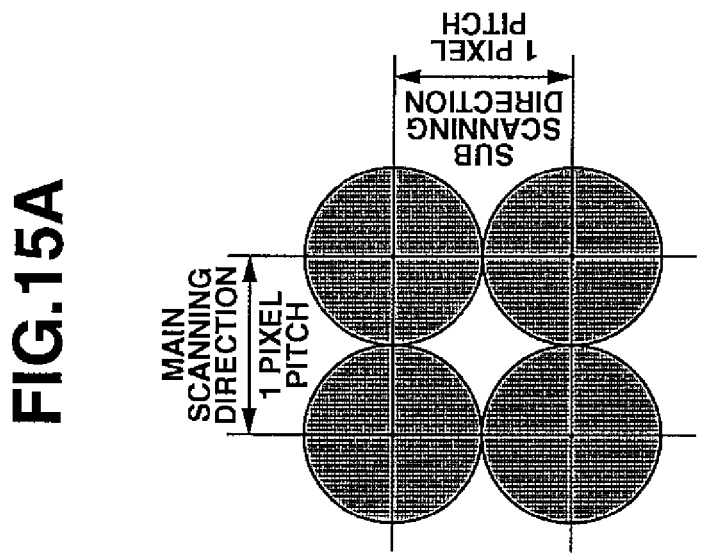

FIG. 15A to 15C are diagrams for schematically explaining the contents of skew correction. In FIG. 15, appearance of the latent image formed on the photoreceptor surface is represented in a frame format.

FIG. 15A shows a 1 pixel pitch in the main scanning direction and sub scanning direction.

FIG. 15B shows the latent image formed on the photoreceptor surface with the exposure head having a gradation control function. In the example shown in FIG. 15B, PWM (pulse width modulation) control and light quantity correction are performed between the 1 pixel pitch from row A toward row B.

FIG. 15C shows a state where variation (skew) in the position of forming the latent image has occurred due to variation in the position of the light emitting element or condenser lens in the sub scanning direction of the exposure head. The skew shown in FIG. 15C can be corrected by controlling the emission timing of the light emitting element to be delayed for a prescribed time according to the skew quantity with the normal state shown in FIG. 15B as the reference thereof. Specifics of skew correction will be described later.

Figures 16A, 16B:
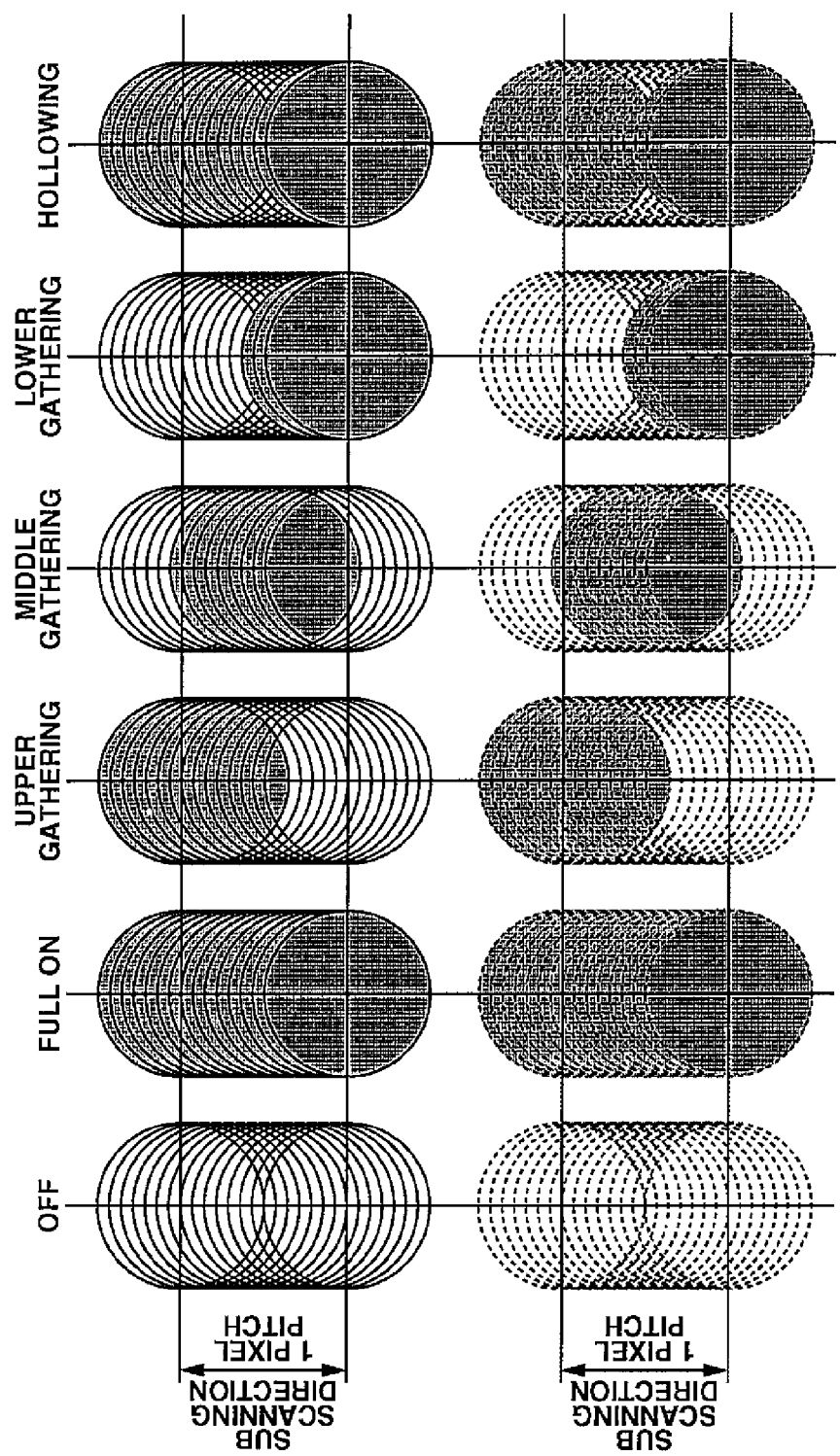
FIGS. 16A and 16B are diagrams for schematically explaining the contents of dot gathering control.

FIGS. 16A and 16B are diagrams for schematically explaining the contents of dot gathering control. In FIG. 16, the upper FIG. 16A represents the emission state in a frame format, and the lower FIG. 16B represents the appearance of the latent image formed on the photoreceptor surface in a frame format.

As shown in the respective far left columns of FIG. 16A and FIG. 16B, no latent image is formed when the light emitting element is not emitted (OFF).

As shown in the respective second columns from the left of FIG. 16A and FIG. 16B, when the light emitting element is emitted for the entire duration (FULL ON), a long latent image is formed across 2 adjoining pixels.

As shown in the respective third columns from the left of FIG. 16A and FIG. 16B, when the light emitting element is emitted at the starting point of the emission period, and thereafter not emitted (upper gathering), a short latent image is formed on the pixel side at the topside of the diagram among the 2 adjoining pixels.

As shown in the respective fourth columns from the left of FIG. 16A and FIG. 16B, when the light emitting element is emitted in the middle of the emission period; that is, when it is not emitted at the start, is thereafter emitted midway, and then not emitted (middle gathering), a short latent image is formed at an intermediate position of the 2 adjoining pixels.

As shown in the respective fifth columns from the left of FIG. 16A and FIG. 16B, when the light emitting element is emitted at the terminal point side of the emission period; that is, when the light emitting element is not emitted at the start, and is thereafter emitted a while later (lower gathering), a short latent image is formed on the pixel side at the bottom side of the diagram among the 2 adjoining pixels.

As shown in the respective sixth columns from the left of FIG. 16A and FIG. 16B, when the light emitting element is divided and emitted at the starting point side and terminal point side of the emission period; that is, when it is emitted at the start, thereafter not emitted, and then emitted once again later on (hollowing), a latent image is formed across the 2 adjoining pixels and with less light exposure at an intermediate position between the 2 pixels.

FIG. 17A to 17E are diagrams for explaining the drive waveform of a light emitting element for performing skew correction and dot gathering control. Since skew correction and dot correction are both processed on the same time axis based on the emission time control of the light emitting element, the circuitry can be simplified by collectively handling these corrections.

Specifically, as shown in the respective diagrams of FIG. 17A to FIG. 17E, in the emission timing control of the light emitting element, a prescribed time from the drive start timing is set as the skew delay controllable period, and an emission period is set thereafter. During this skew delay controllable period, delay time S according to the skew quantity is set within a prescribed range. The emission start position (start of emission timing) of the light emitting element is delayed according to the set value of this delay time S, and skew correction is realized thereby.

Further, emission time of the light emitting element is set within the range of time width W of the emission period. For instance, as shown in FIG. 17A, when the light emitting element is emitted for the entire duration (FULL ON), emission time X will be set equal to foregoing W.

Similarly, as shown in FIG. 17B, when the emission period of the light emitting element is set to "upper gathering", emission time X is set from the starting point of the emission period.

As shown in FIG. 17C, when the emission period of the light emitting element is set to "lower gathering", emission time X is set from the point in time non-emission time (W−X) has elapsed from the starting point of the emission period.

As shown in FIG. 17D, when the emission period of the light emitting element is set to "middle gathering", emission time X is set from the point in time non-emission time (W−X)/2 has elapsed from the starting point of the emission period.

As shown in FIG. 17E, when the emission period of the light emitting element is set to "hollowing", emission time (W−X)/2 is set from the starting point of the emission period and non-emission time X is set from the point in time this emission time has elapsed.

In this embodiment, the foregoing skew correction and dot gathering control are mainly performed with the emission timing control circuits 116o, 116e. Configuration of these emission timing control circuits 116o, 116e and the peripheral circuits thereof is now explained in detail.

Figure 18:
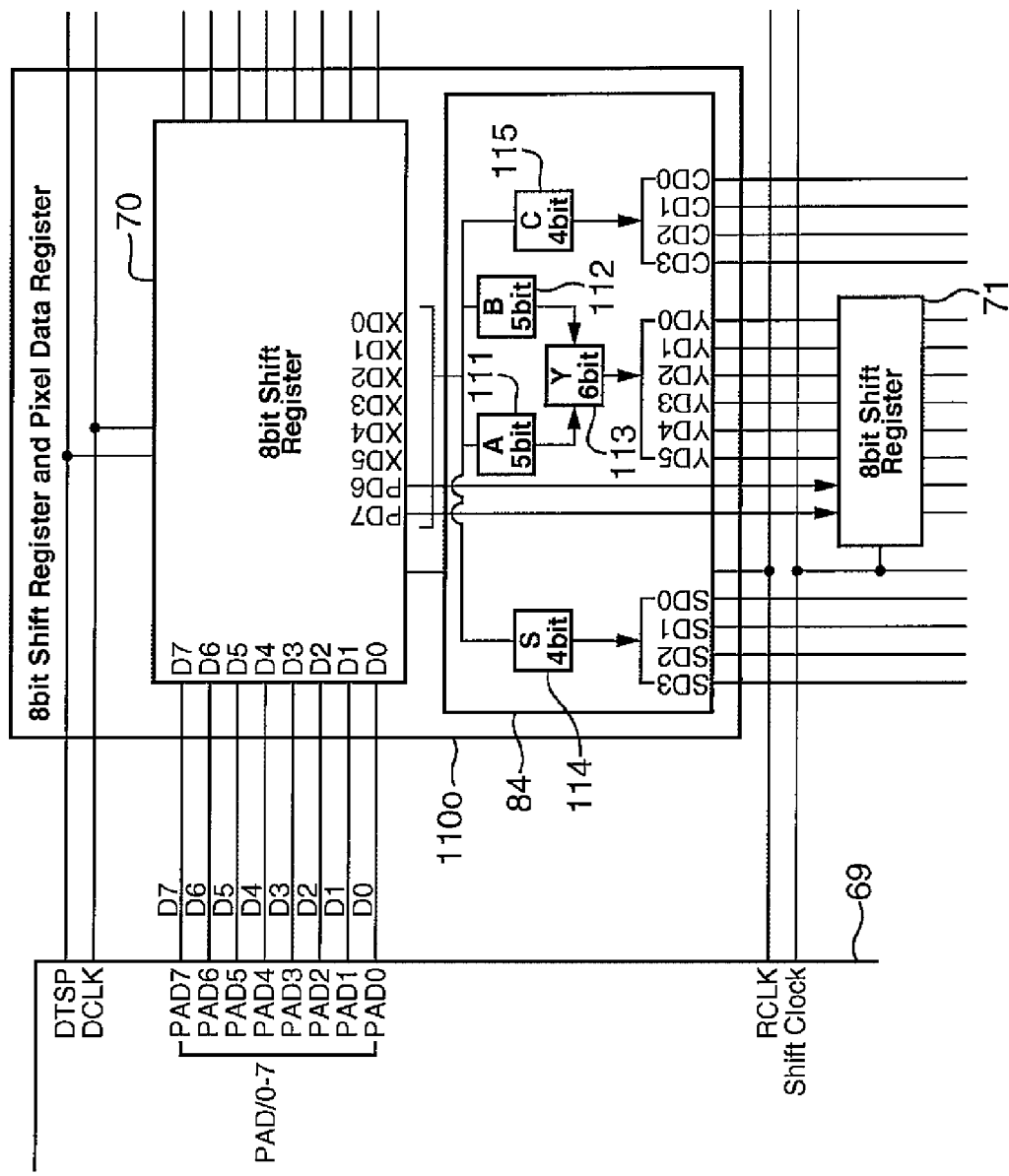
FIG. 18 is a block diagram showing a configuration example of each register.

FIG. 18 is a block diagram showing a configuration example of each register 110o, 110e. Although FIG. 18 illustrates the configuration of the register 110o, the register 110e is also configured the same. As shown in FIG. 18, the register 110o includes a shift register 70 and a pixel data register 84. Incidentally, the registers 110o, 110e correspond to "data retention units".

The 8 bit data output from the timing controller 69 and input to the shift register 70 is constituted from 5 bit data (bit D0 to D4) showing the light quantity data (gradation data) or correction data, and 3 bit data (bit D5 to D7) representing the control code. With respect to each data latched by the shift register 70, data of bit D0 to D5 is output as data of bit XD0 to XD5, and data of bit D6, D7 is output as data of bit PD6, PD7. Incidentally, "correction data" is data for correcting the emission quantity of the light emitting element 79 represented by the light quantity data in correspondence with the conditions unique to the respective image formation devices.

In the pixel data register 84 of this embodiment, when the contents of the 3 bit data showing the control code are XD5=1, PD6=0 and PD7=0, the 5 bit data of bit XD0 to XD4 is loaded as "correction data" in the register 111 (input A).

When the contents of the 3 bit data showing the control code are XD5=1, PD6=0 and PD7=1, the 5 bit data of bit XD0 to XD4 is loaded as "current data" in the register 115 (input C).

When the contents of the 3 bit data showing the control code are XD5=1, PD6=1 and PD7=0, the 5 bit data of bit XD0 to XD4 is loaded as "skew data" in the register 114 (input S).

When the contents of the 3 bit data showing the control code are XD5=0, PD6=*(no object) and PD7=*(no object), the 5 bit data of bit XD0 to XD4 is loaded as "light quantity data" in the register 112 (input B). Data of each bit PD6, PD7 during the loading of this light quantity data will become 2 bit data showing the dot gathering control data.

The register 113 (input Y) stores the added result of input A and input B as the "emission time data". This emission time data shows the length of time of emitting the light emitting element 79 with PWM control. Data of each bit YD0 to YD5 and bit PD6, PD7, which were output from the register 113, is input to the shift register 71.

With the exposure head 1 of this embodiment, loading (data setting) of the correction data, current data and skew data is foremost performed, and 5 bit light quantity data and 2 bit dot gathering control data are thereafter processed at printing speed in order to control the emission of the light emitting element.

Figure 19:
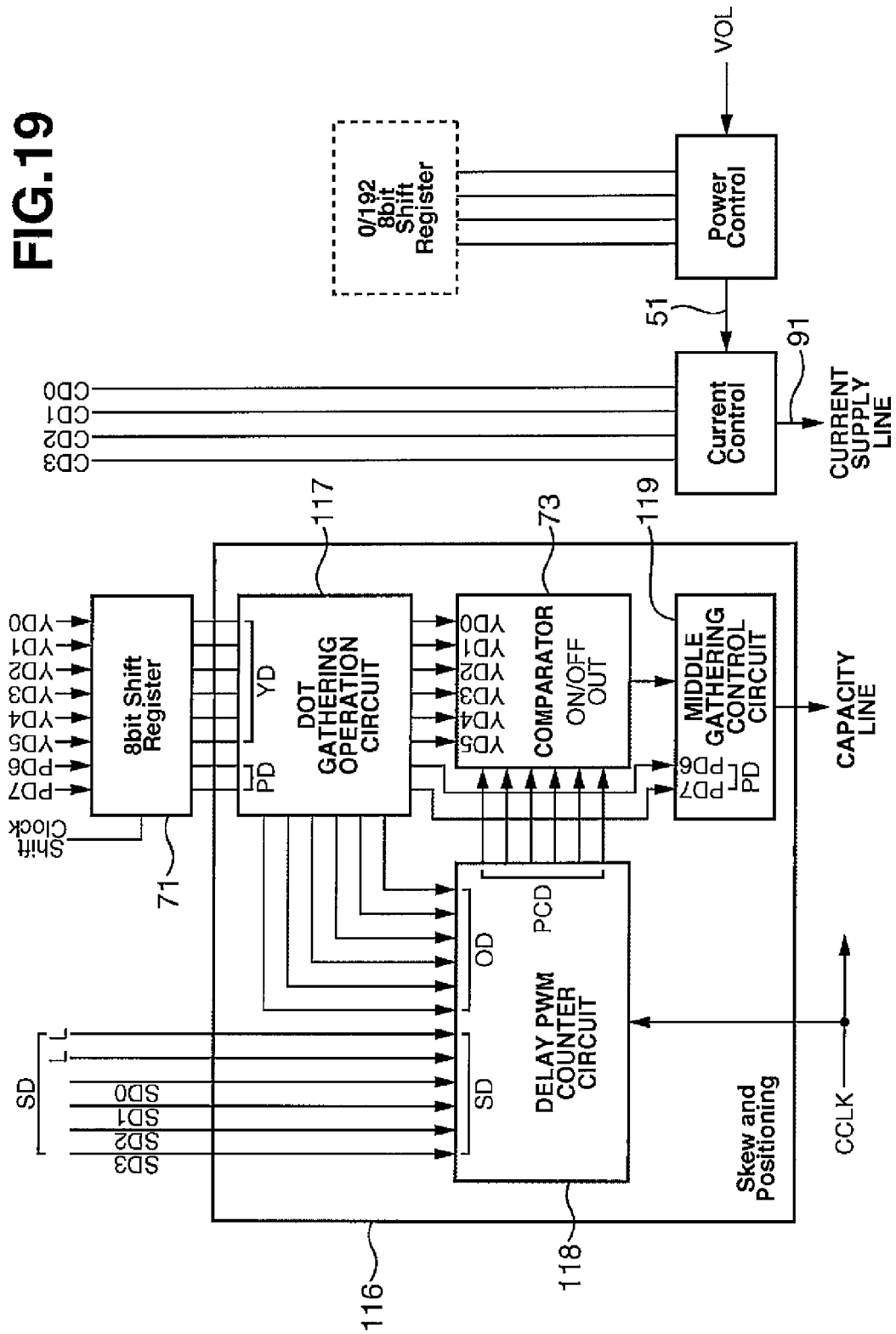
FIG. 19 is a block diagram for explaining the detailed configuration of the emission timing control circuit.

FIG. 19 is a block diagram for explaining the detailed configuration of the emission timing control circuit 116. The emission timing control circuit 116 in this example is configured by including a dot gathering operation circuit 117, a delay PWM counter circuit 118, a comparator 73 and a middle gathering inversion control circuit 119.

The dot gathering operation circuit 117 operates the emission position data (non-emission time data) which shows from which position during the emission period (time width W) the emission time X should be started; that is, how long the light emitting element should be retained in a non-emission state from the starting point of the emission period, based on the bit gathering control data (bit PD6, PD7) input from the shift register 71. This emission position data (bit OD0 to OD5) is output to the delay PWM counter 118. Further, the data of bit PD6, PD7 input to the dot gathering operation circuit 117 is also output to the middle gathering inversion control circuit 119. Moreover, the emission time data of bit YD0 to YD5 input to the dot gathering operation circuit 117 is output to the comparator 73.

The delay PWM counter circuit (delay time measurement circuit) 118 performs processing for setting the emission start timing of the light emitting element 79 based on the skew data (bit SD0 to SD4) obtained from the pixel data register 84 and emission position data (bit OD0 to OD5) obtained from the dot gathering operation circuit 117. Specifically, the delay time to be set before the start of emission of the light emitting element 79 is sought by adding delay time S required for skew correction to the time indicated with the emission position data; specifically, one among "0", "(W−X)/2" or "(W−X)". And, as a result of a prescribed signal being output from the delay PWM counter circuit 118 after the lapse of this delay time, the emission start timing of the light emitting element 79 is thereby set (c.f. FIG. 17).

Figure 20:
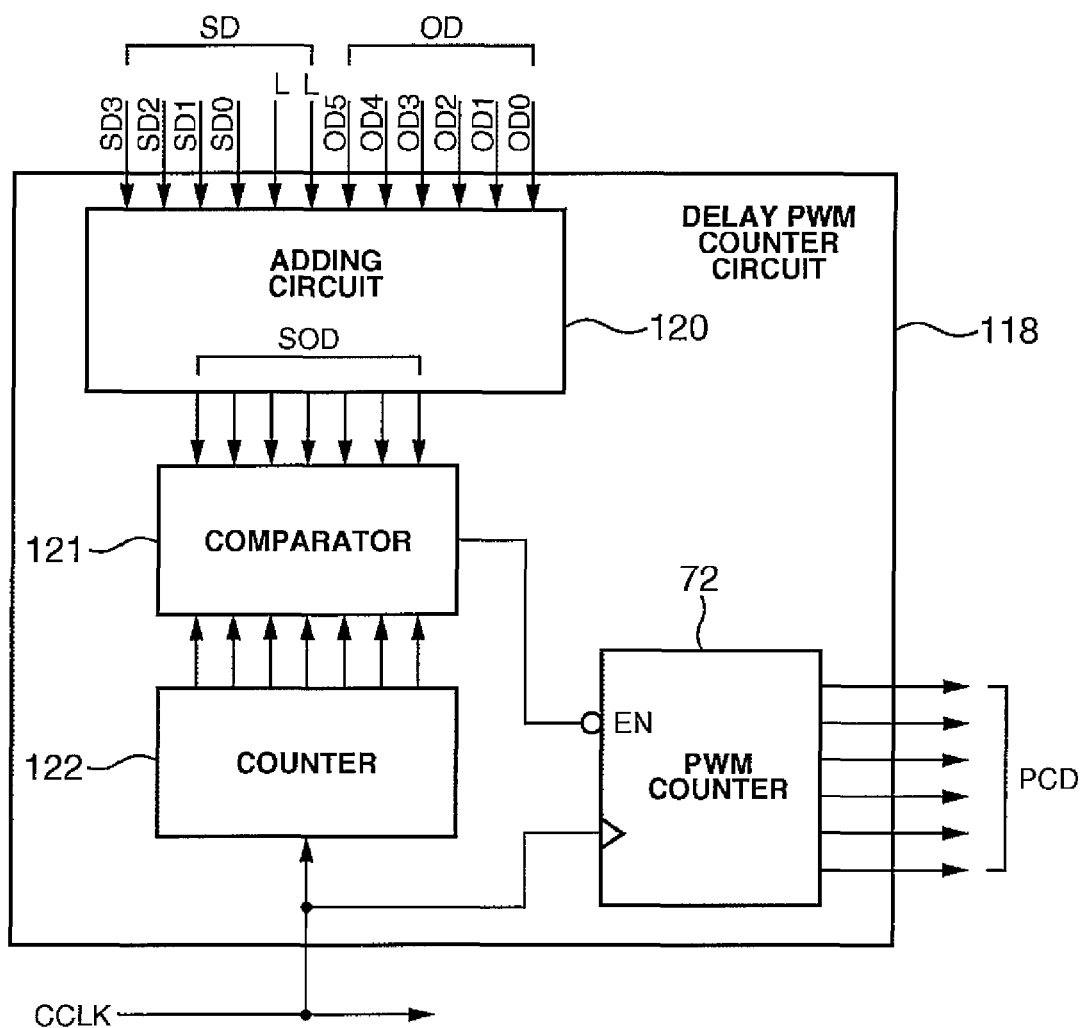
FIG. 20 is a diagram showing a configuration example of a delay PWM counter circuit.

FIG. 20 is a diagram showing a configuration example of the delay PWM counter circuit 118. Specifically, the delay PWM counter circuit 118 is configured from an adding circuit 120 for adding the skew data and emission period data (non-emission time data) in order to obtain data showing the emission start timing, a counter 122 for synchronizing with and counting up the pulses of the clock signal CCLK, a comparator 121 for outputting a signal (enable signal) for enabling the PWM counter 72 at the point in time the count value from the counter 122 coincides with the data (data showing the emission start timing) received from the adding circuit 120, and a PWM counter 72 for synchronizing with and counting up the clock signals CCLK from the point in time the enable signal is output.

The comparator (emission instruction circuit) 73 compares the count value and emission time data (bit YD0 to YD5) when the output of the count value from the delay PWM counter circuit 118 is started after reaching the emission start timing, and outputs an ON signal (emission instruction signal) until the values coincide. This ON signal is subject to middle gathering and inversion via the middle gathering inversion control circuit 119 as required, or left as is, and input to the light emitting element drive circuit 74o (or 74e) via the capacity line. The output starting point of the ON signal corresponds to the emission start timing of the light emitting element, and the output terminal point corresponds to the emission end timing.

Figure 21:
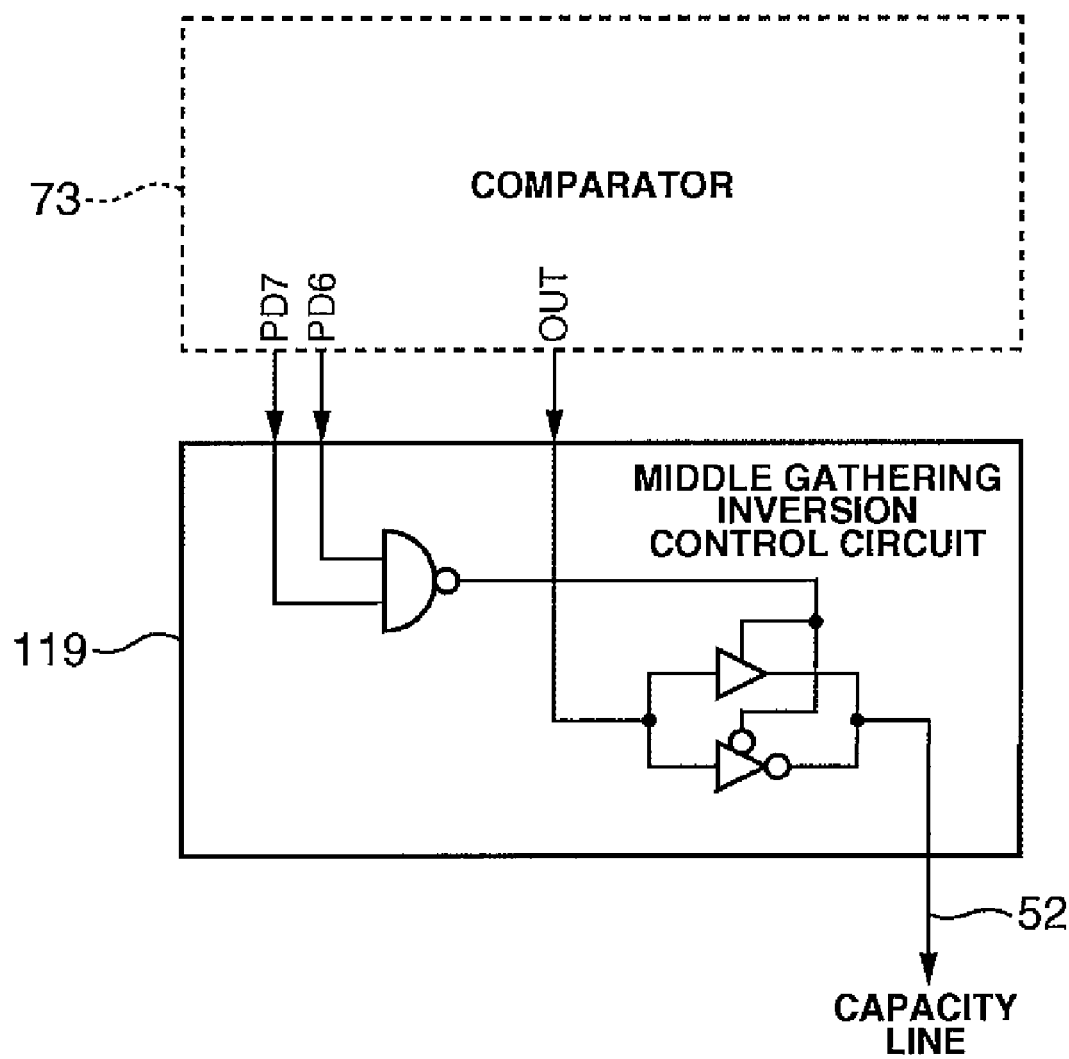
FIG. 21 is a diagram showing a configuration example of a middle gathering inversion control circuit.

The middle gathering inversion control circuit 119, for instance, is configured as shown in FIG. 21, and inverses the polarity of the output (capacity line) of the comparator 73 based on the contents of the dot gathering data (bit PD7, PD6). Thereby, the middle gathering and inversion of the emission position will be possible.

Next, a configuration example of an image formation device having the exposure head of this embodiment is explained.

Figure 22:
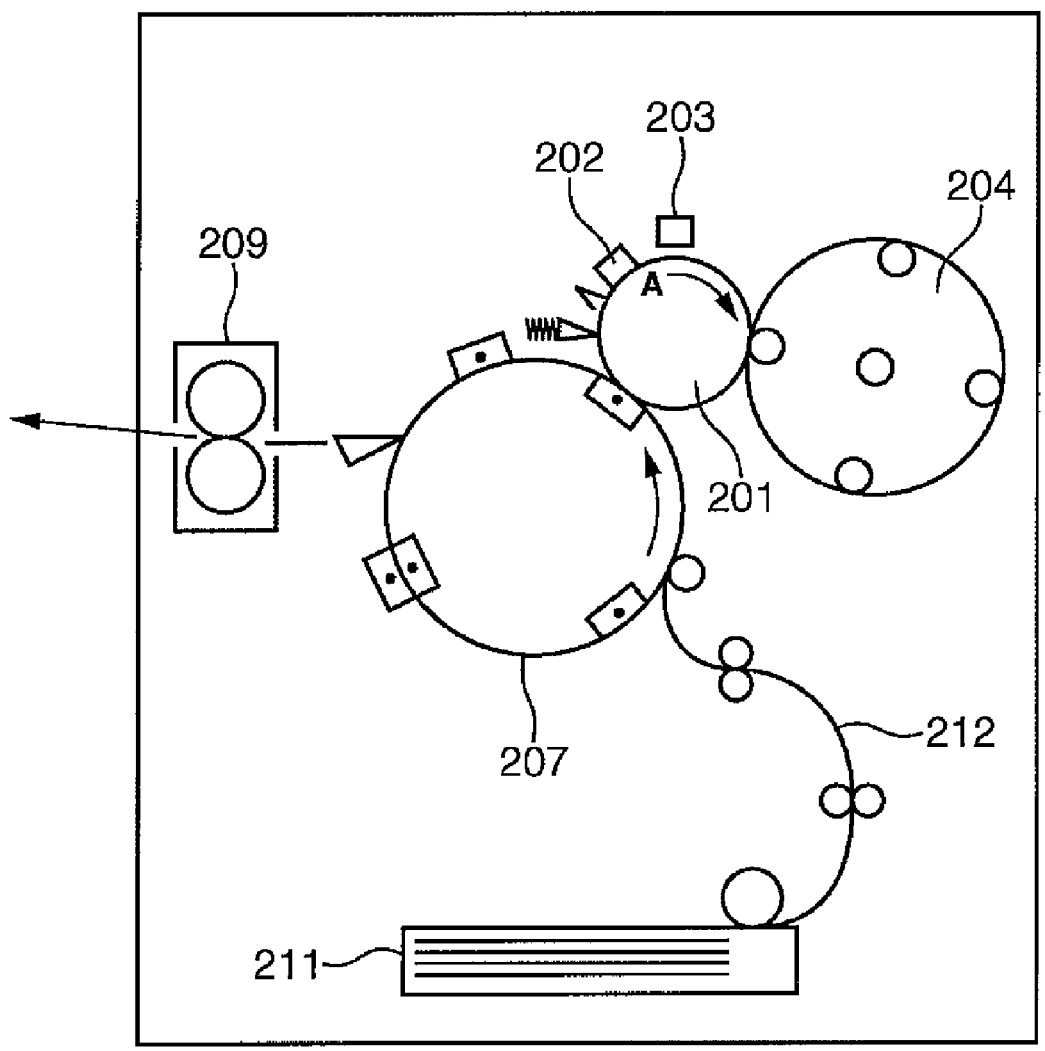
FIG. 22 is a diagram for explaining a configuration example of an image formation device.

FIG. 22 is a diagram for explaining a configuration example of an image formation device. The image formation device (printer) 200 of the configuration example shown in FIG. 22 is configured by including a photoreceptor drum 201, a charger 202 for uniformly charging this photoreceptor drum 201, an exposure head 203 for forming an electrostatic latent image on this charged photoreceptor drum 201, a rotating developer 204 for developing the electrostatic latent image formed on the toner image photoreceptor drum 201 and forming a toner image, a transcription drum 207 for performing electrostatic image transfer of the obtained toner image onto a sheet 212, a fixing unit 209 for fixing the toner image on the sheet 212 separated from the transcription drum 207, and a sheet tray 211. The exposure head of this embodiment may be used as the exposure head 203 in this kind of image formation device 200 in order to seek the simplification in the configuration of the image formation device 200.

Incidentally, the invention is not limited to the description of the embodiments described above, and may be modified in various forms within the scope of the gist of this invention. For instance, although an organic EL element was used as an example of the light emitting element in the foregoing embodiments, other light emitting elements may also be employed.

What is claimed is:

1. An electronic circuit comprising:
   a dot gathering operation circuit that operates, based on dot gathering control data, non-emission time data indicating time for which each light emitting element is to be retained in a non-emission state from the starting point of the emission period, the dot gathering control data indicating whether to make each of plural light emitting elements emit light at the starting point side, terminal point side, or in the middle of the starting point and the terminal point in an emission period corresponding to a 1-pixel pitch in a sub scanning direction, or to make each light emitting element emit light at both the starting point side and terminal point side;
   a delay time measurement circuit that calculates, by adding skew data indicating a skew quantity in each light emitting element and the non-emission time data output from the dot gathering operation circuit, delay time to be set before starting light emission by each light emitting element, and outputs a prescribed signal after a lapse of the delay time; and
   an emission instruction circuit that outputs, based on emission time data indicating an emission time in each light emitting element, to a light emitting element drive circuit an emission instruction signal from the point in time the prescribed signal is output from the delay time measurement circuit up until the elapse of the emission time indicated by the emission time data.

2. The electronic circuit according to claim 1, further comprising:
   a data retaining means connected to the dot gathering operation circuit, the delay time measurement circuit, and the emission instruction circuit, that retains the dot gathering control data, the emission time data, and the skew data.

3. The electronic circuit according to claim 1, comprising:
   an adding circuit that adds the skew data and the non-emission time data;
   a first counter that synchronizes with and counts up prescribed clock signals;
   a comparator that outputs an enable signal when the addition result of the adding circuit and the count value of the first counter coincide; and
   a second counter that synchronizes with and counts up the clock signals from the point in time the enable signal is output from the comparator.

4. The electronic circuit according to claim 3, wherein the emission instruction circuit includes a comparator that compares the count value output from the second counter and the emission time data and outputs the emission instruction signal until the count value output from the second counter and the emission time data coincides.

5. An exposure head control circuit comprising the electronic circuit according to claim 1.

6. An exposure head comprising the exposure head control circuit according to claim 1.

7. An image formation device comprising the exposure head according to claim 6.

* * * * *